April 13, 1965 G. RAUGLAS 3,177,985
TWO WAY AUTOMATIC SLACK ADJUSTER
Filed March 21, 1963 6 Sheets-Sheet 1
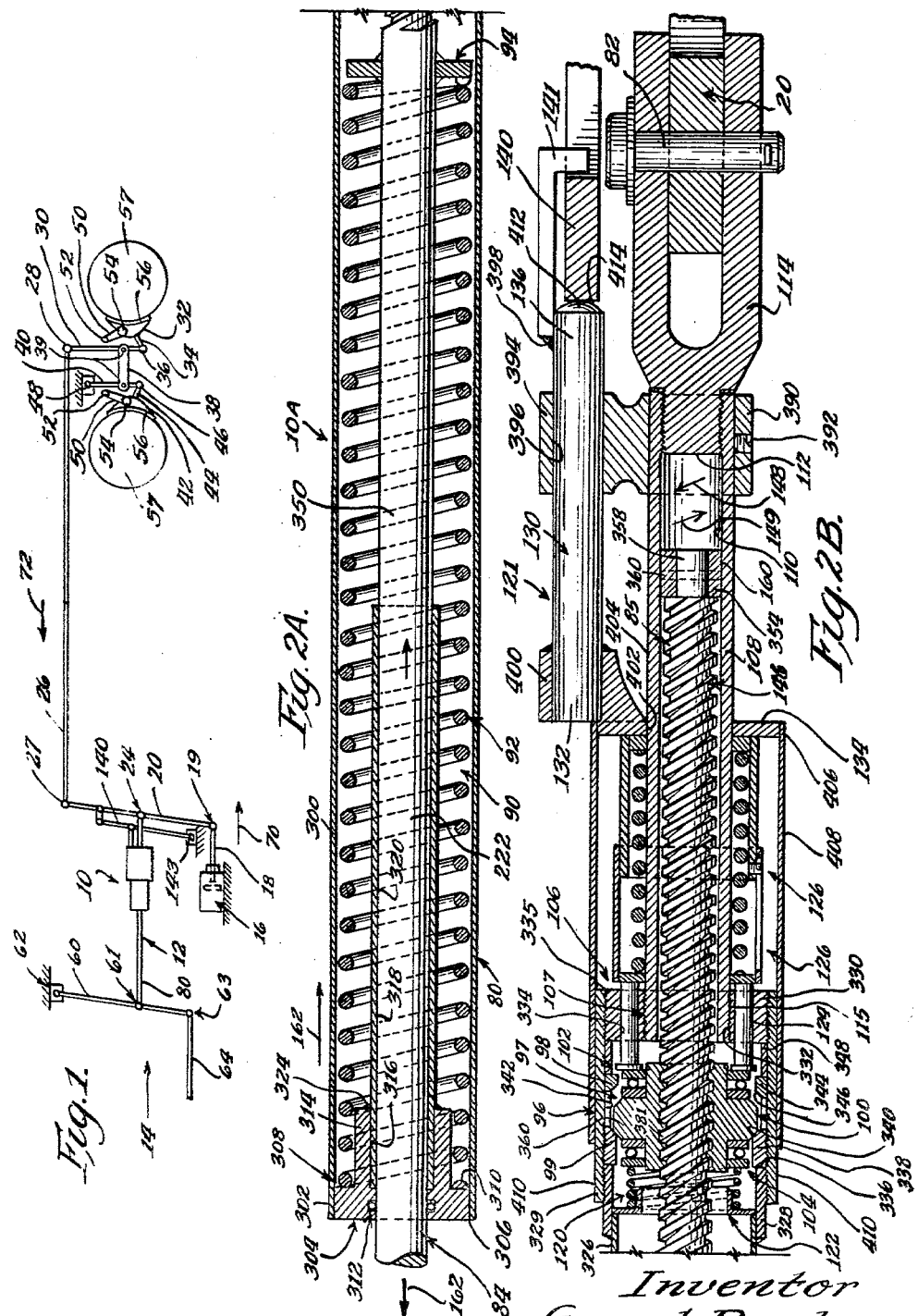
Inventor
Gerard Rauglas
By Mann, Brown & McWilliams
Attys.

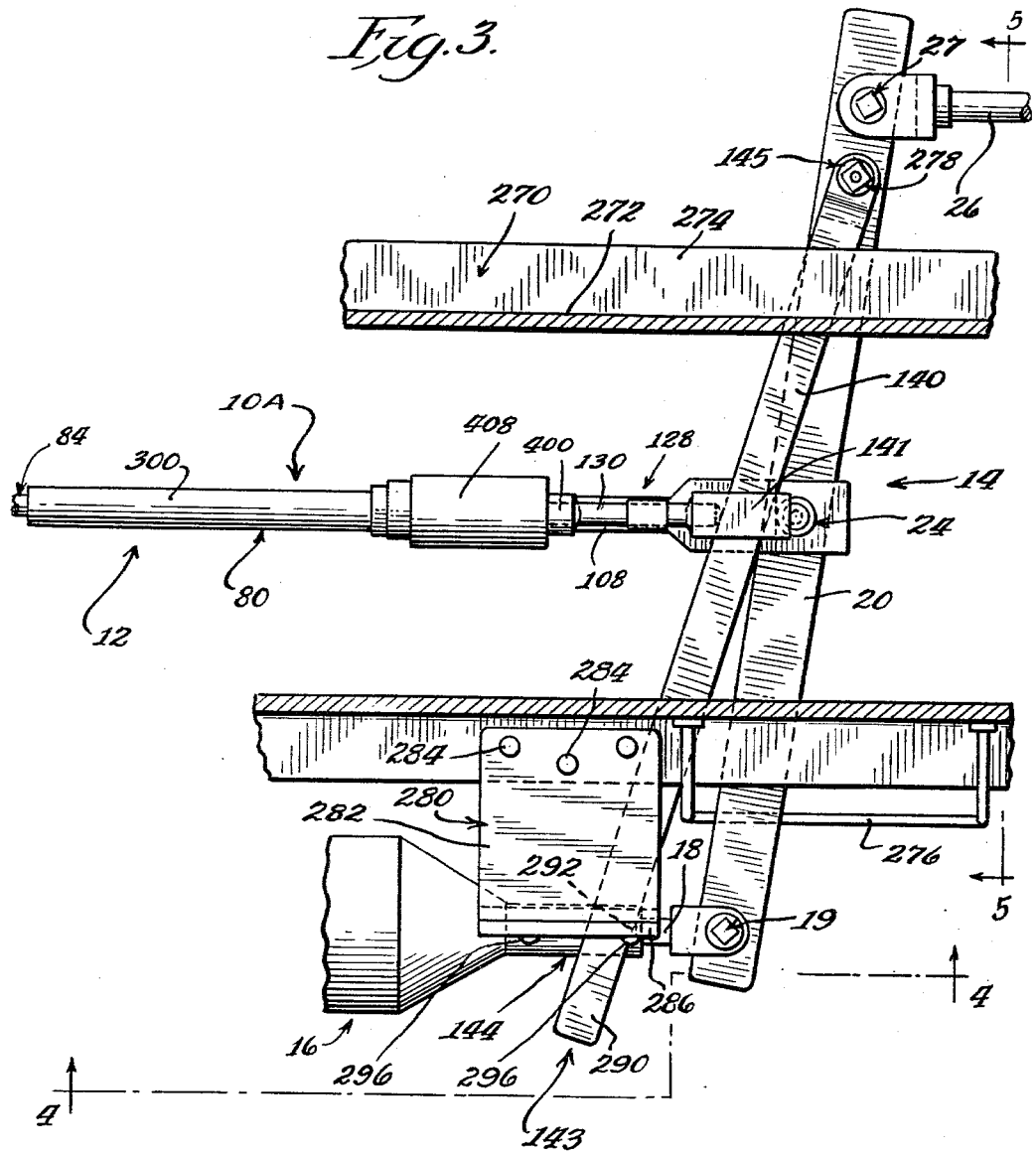

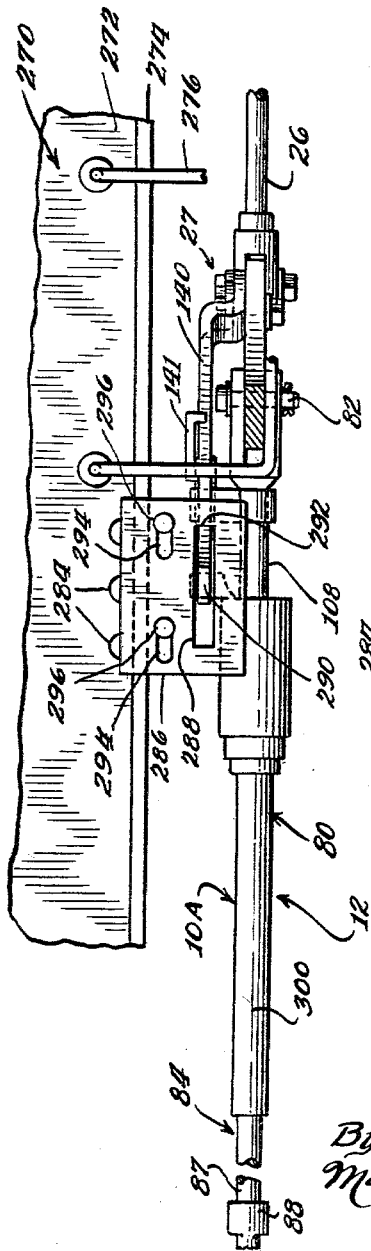

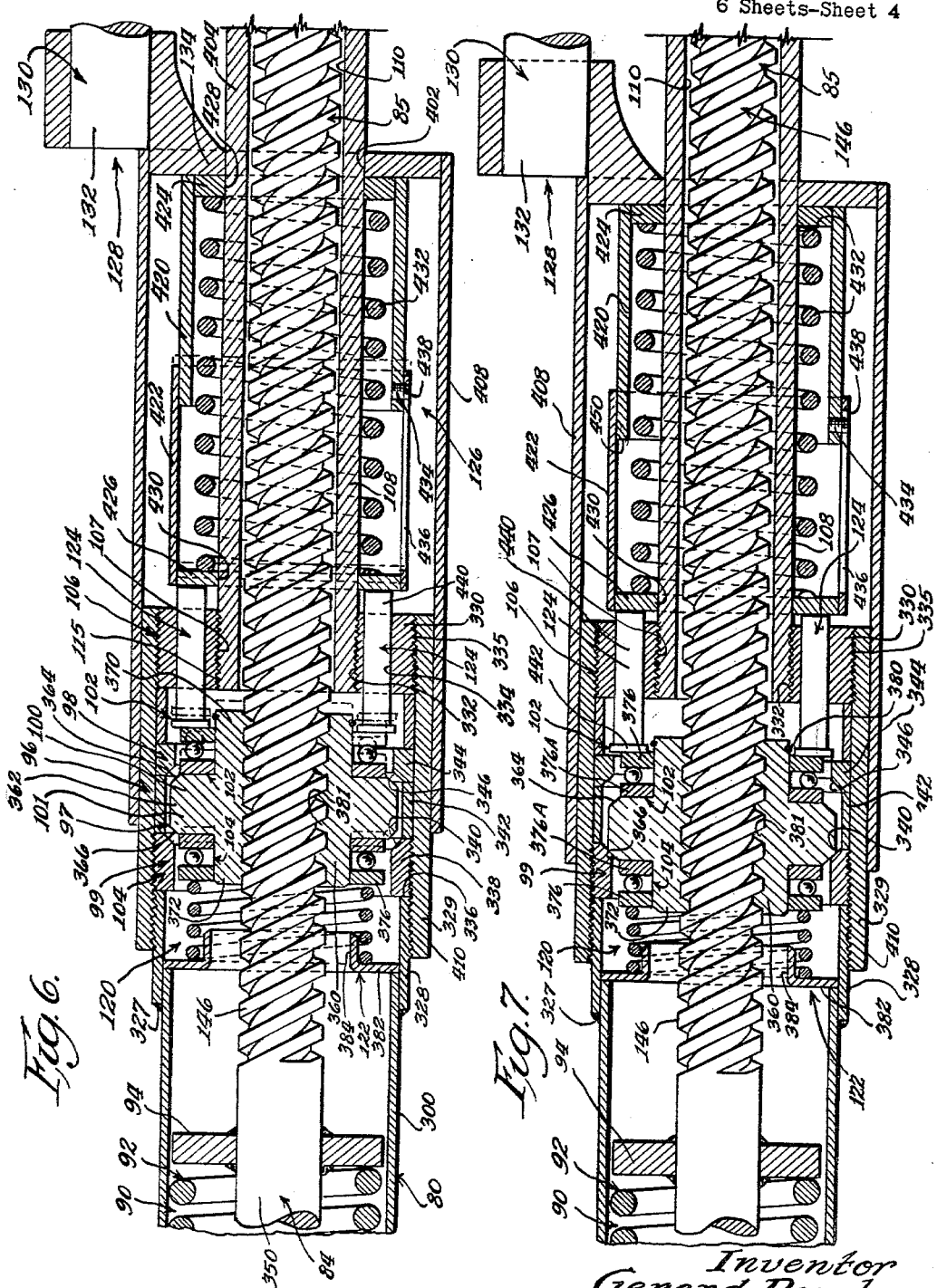

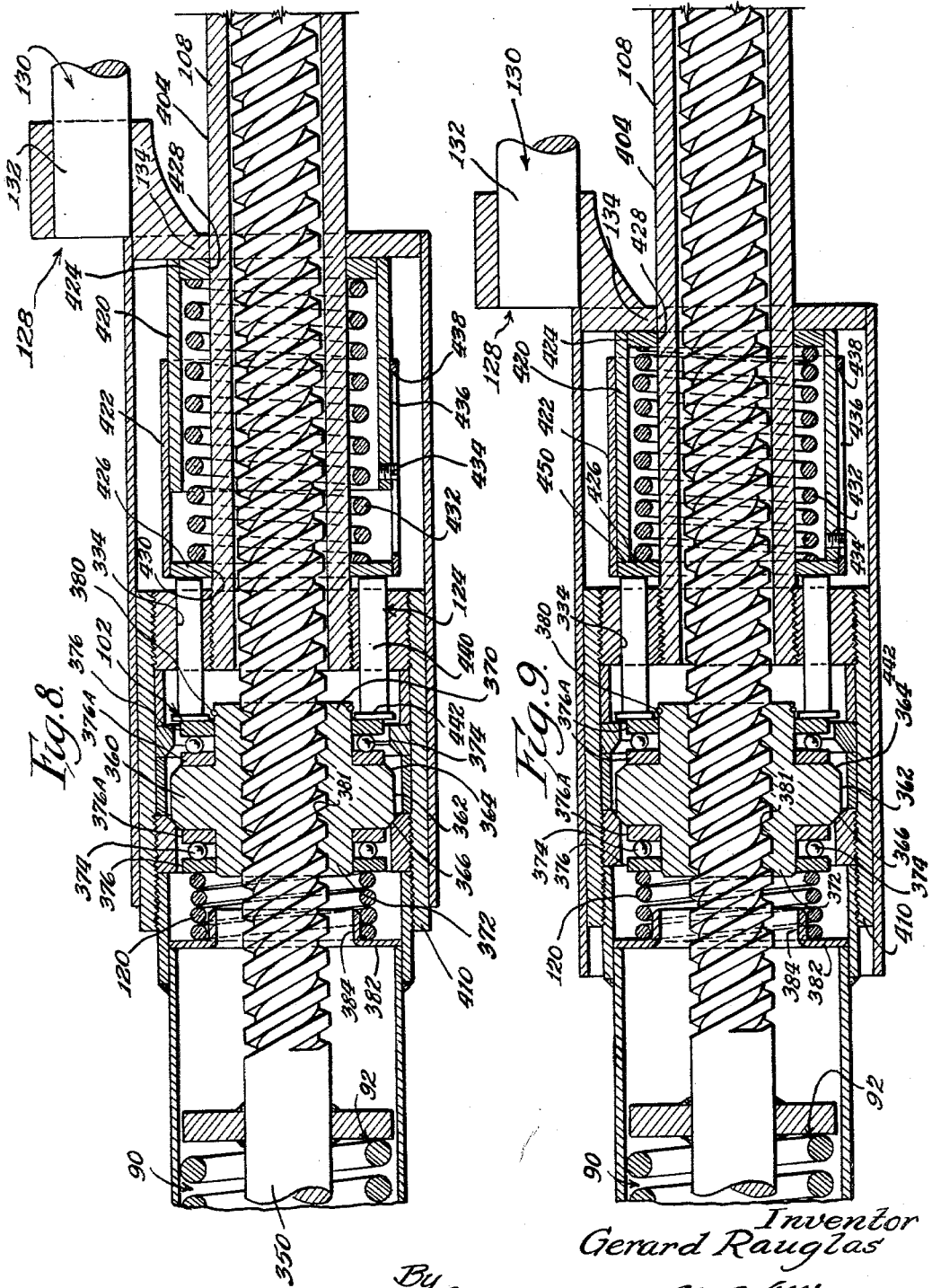

April 13, 1965 G. RAUGLAS 3,177,985
TWO WAY AUTOMATIC SLACK ADJUSTER
Filed March 21, 1963 6 Sheets-Sheet 6
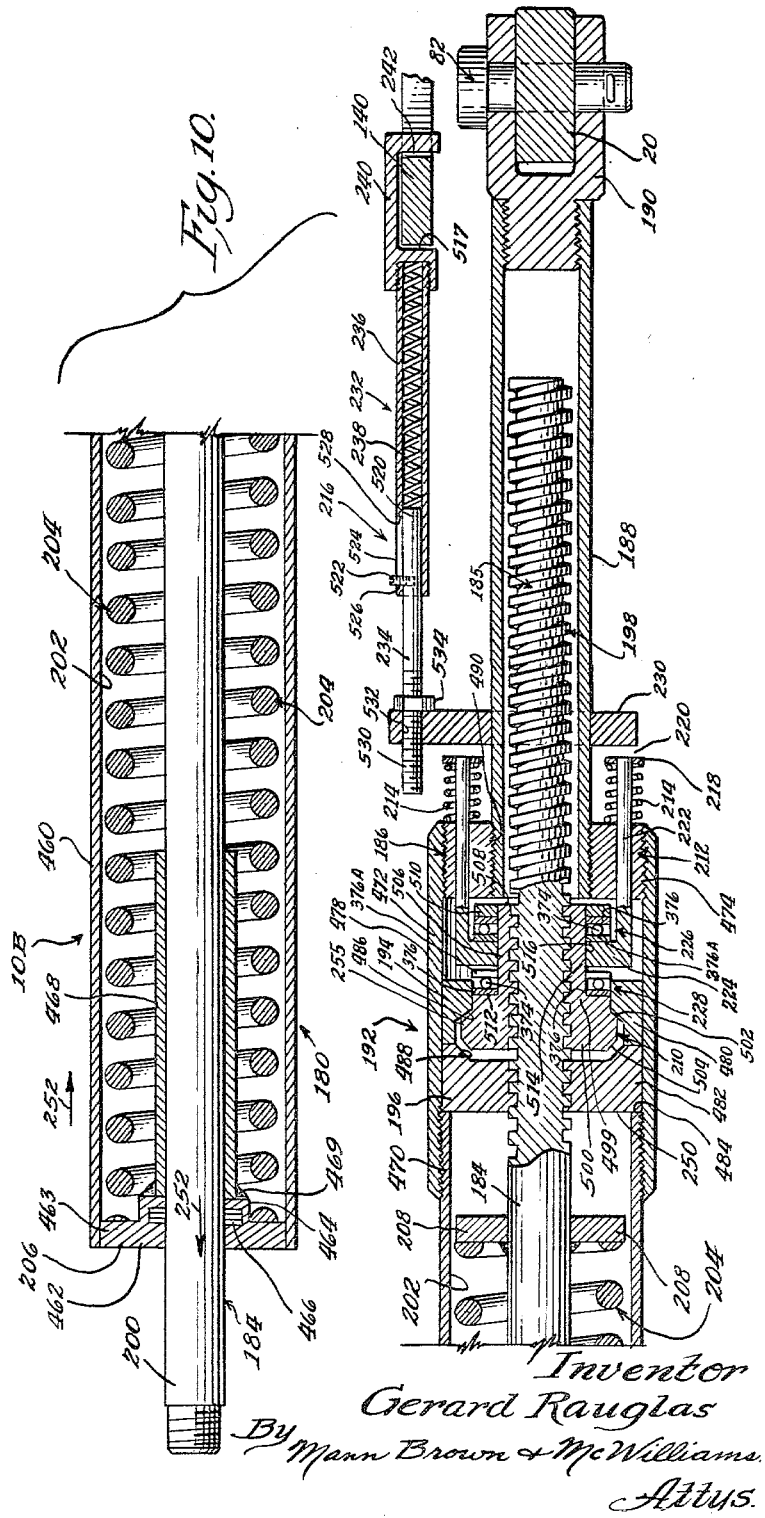
Inventor
Gerard Rauglas
By Mann Brown & McWilliams
Attys.

United States Patent Office 3,177,985
Patented Apr. 13, 1965

3,177,985
TWO WAY AUTOMATIC SLACK ADJUSTER
Gerard Rauglas, Aroma Park, Ill., assignor to Cardwell Westinghouse Company, Chicago, Ill., a corporation of Illinois
Filed Mar. 21, 1963, Ser. No. 266,919
15 Claims. (Cl. 188—202)

My invention relates to a two way automatic slack adjuster for application to railroad car brake rigging, and more particularly to a brake rigging slack control device that automatically takes up rigging slack (caused by brake shoe wear and the like) during the normal functioning of thet car brake system, and that automatically adjusts itself to let out slack when the car brake shoes are replaced.

Railroad car brake rigging slack adjusters are conventionally used to automatically take up the rigging slack caused by brake shoe wear to insure that the brake cylinder power stroke remains approximately the same length for each operation of the car brake system.

However, conventional slack adjusters have heretofore generally failed to take into consideration that the rigging slack taken up must also be conveniently released when brake shoe replacement is required.

Thus, when the customary routine inspection of the brake shoe wear is made, as by inspectors known to the industry as "car knockers," and the amount of brake shoe remaining indicates that new brake shoes are required, many forms of conventional slack adjusters have heretofore required that the individual effecting such replacement (who is usually the car knocker), must crawl under the car to manually effect release of the slack adjuster so that the brake rigging brake beams may be sufficiently separated from the truck wheels to permit the necessary shoe replacement manipulations. Release of the slack adjuster is necessary to provide adequate rigging slack "let out" for accommodating the necessary brake movement in connection with shoe replacement.

Heretofore, some attempts have been made to design slack adjusters that would automatically permit this necessary brake rigging slack let out movement when the brake shoe replacement is required, but the complex arrangements resulting have proved to be impractical for a number of important reasons. For instance, since the slack adjuster is applied in an exposed position underneath the car, it is subjected in day to day use to the worst possible operating conditions involving heavy dirt accumulations and the worst aspects of adverse weather conditions, not to mention shocks imposed on the car structure by high speed coupler impacts and the like.

Nevertheless, railroads have come to call for fully automatic slack adjuster operation in equipment of this type (meaning that the slack adjuster must provide for both automatic slack take up and let out), and this points up the general need for a practical form of fully automatic slack adjuster arrangement which is arranged so that it is fully operative regardless of any particular type of operating condition, and yet is composed of few and simple parts and gives uniformly consistent results.

A principal object of this invention is to provide a practical two way automatic slack adjuster that functions truly automatically in providing for both rigging slack take up and let out.

Another principal embodiment of the invention is to provide a fully automatic slack adjuster, the efficient function of which is substantially independent of the conditions under which it is to operate.

Another important object of the invention is to provide a fully automatic slack adjuster of the screw and nut type that is of greatly simplified construction and markedly improved over-all reliability for devices of this type.

Still another important object of the invention is to provide a fully automatic slack adjuster that in a single stroke achieves the slack adjustment required under substantially all operating conditions.

A further object of the invention is to provide a slack adjuster susceptible of uniformly providing the desired slack adjusting function to very close tolerances.

Yet further objects of the invention are to provide a screw and nut type slack adjuster that is of few and simple parts, that is light in weight, and that is inexpensive of manufacture, convenient to install in either existing or new brake rigging arrangements, and consistently reliable in operation.

Other objects, uses, and advantages will be obvious or become apparent from a consideration of the following detailed description and the application drawings.

In the drawings:

FIGURE 1 is a diagrammatic view illustrating a typical brake rigging arrangement to which the slack adjuster of this application is directly applicable;

FIGURES 2A and 2B when considered together comprise a composite longitudinal vertical cross-sectional view taken longitudinally of the specific embodiment of the slack adjuster of this invention, showing the adjuster elements largely in elevation and in their power stroke positions;

FIGURE 3 is a view similar to that of FIGURE 1, but on an enlarged scale and more specifically showing the slack adjuster of FIGURES 2A and 2B applied to the brake rigging in a center rod application;

FIGURE 4 is a side elevational view of the structure shown in FIGURE 3, taken substantially along the line 4—4 of FIGURE 3;

FIGURE 5 is an end elevational view taken from the right hand side of FIGURE 3 and substantially along line 5—5 of FIGURE 3;

FIGURE 6 is a fragmental view similar to that of FIGURE 2B but providing a two position showing illustrating in broken lines the position of the slack adjuster nut with respect to its housing in the released position of the slack adjuster, while the full line position shows the nut in its slack adjusting position;

FIGURE 7 is a fragmental cross-sectional view similar to that of FIGURE 2B and showing the slack adjuster parts in their full power stroke positions under normal operating conditions, but on a somewhat enlarged scale;

FIGURE 8 is a view similar to that of FIGURES 6 and 7, but shows a special functioning of this device when several brake shoes have been lost from the brake beams;

FIGURE 9 is a view similar to that of FIGURE 8, but shows a special operating condition of this device when more than two brake shoes have been lost from the rigging; and FIGURE 10 is a composite view similar to that of FIGURES 2A and 2B illustrating a modified form of the invention.

However, it is to be understood that the specific illustrations of the drawing figures are provided primarily to comply with the requirements of 35 U.S.C. 112, and that the invention is susceptible of other embodiments and modifications that will occur to those skilled in the art without departing from letter and spirit of the appended claims.

*General description*

Referring now to FIGURE 1, reference numeral 10 generally indicates a diagrammatically illustrated embodiment of this invention incorporating in the center rod structure 12 of a conventional brake rigging arrangement generally indicated by reference numeral 14. A preferred specific embodiment of the device 10 as shown at 10A in FIGURES 2A–9, while a modified embodiment of the invention is indicated at 10B in FIGURE 10.

As is well-known in the art, the brake rigging 14 customarily includes air actuated brake cylinder 16 that is secured to the car in any suitable manner and includes a thrust or piston rod 18 that is pivotally connected as at 19 to a cylinder or live lever 20, which is in turn pivotally connected to the center rod structure as at 24 and a connecting rod 26 as at 27 that extends to one of the car trucks, where the rod 26 may be pivotally connected as at 28 to the actuating truck lever 30 that operates one of the brake beams 32 through a link 34 that is pivotally connected to lever 30 as at 36. The truck lever 30 is connected to truck dead lever 40 by link 38 and pivotal joints 39, and lever 40 is connected to the other brake beam 42 by link 44 (the link 44 being pivotally connected to the lever 40 by pivotal joint 46) and with the lever 40 being pivotally anchored to the car truck structure as at 48.

The brake beams 32 and 42 are customarily suspended from a truck by conventional hanger members 50 which are pivoted to the truck as at 52 and to the brake beam as at 54, respectively and, of course, the brake beams each carry the diagrammatically illustrated brake shoes 56 which are to bear against the diagrammatically illustrated truck wheels 57 for braking purposes.

Center rod structure 12 is also pivotally connected, as at 61 to a dead lever 60 which is fulcrumed in any suitable manner to the car structure, as at 62, and is pivotally connected as at 63 to connecting rod 64, which is in turn operatively connected with the truck brake apparatus of the other car truck in a manner similar to that shown at the right hand side of FIGURE 1.

As is well-known in the art, when a braking of the car is to be effected, the brake cylinder 16 is actuated to move the thrust or piston rod 18 to the right of FIGURE 1, or in the direction of the arrow 70, which tends to throw the cylinder lever 20 counterclockwise about the pivotal connection 24 between it and the center rod structure 12. Likewise, this motion tends to move the connecting rod 26 to the left of FIGURE 1 and in the direction of the arrow 72 to swing the truck lever 30 in a manner to force brake shoes 56 against the diagrammatically illustrated truck wheels 57. The brakes are in effect released when the air is released from cylinders 16 in a conventional manner due to the fact that the weight of brake beams 32 tends to swing them away from the respective wheels 57 about the pivotal hanger mountings 52, which thus causes the connecting rod 26, the cylinder lever 20, and the thrust or piston rod 18 to move in directions opposite to those indicated by the arrows 70 and 72.

Of course, the connection of the center rod structure 12 with lever 60 actuates the lever 60, connecting rod 64 and the truck braking apparatus it is connected to in a manner that is similar to that mentioned with regard to the truck brake apparatus shown in FIGURE 1.

A.A.R. regulations require that the brake power stroke of cylinder 16 be between 7 and 9 inches, although brake cylinders are customarily proportioned and applied to the car to accommodate a stroke as high as 12 inches to accommodate extreme conditions. New cars when their brake rigging is applied and properly adjusted should provide a brake cylinder stroke of 7 inches, assuming that the car trucks have new brake shoes applied thereto.

As is well-known in the art, brake shoes tend to wear away during each application of the car brakes, and while the brake shoe attrition is not materially noticeable for each braking operation, it is cumulative and causes an increase in the amount of slack created in the rigging as day to day use of the car proceeds. The result is that each time the car brakes are to be applied, the brake levers must be moved just a little further toward the wheel each time, which means that a slightly increased movement of the connecting rods 26 and 64, and the thrust or piston rod 18 (assuming no slack adjuster) is required for each time the brakes are applied. A.A.R. regulations require that when brake wear has proceeded to the point that the brake cylinder stroke has "overtravel" of one inch (that is, exceeds the basic 7 inch brake cylinder stroke by one inch), there must be sufficient take up in the brake rigging to restore the brake cylinder to approximately its original 7 inch stroke.

The general function served by the slack adjuster of this invention is to consistently maintain the stroke of the brake cylinder at the prescribed 7 inches and to automatically accommodate or effect the rigging slack take up and let out that is involved in providing such results.

Referring now to the specific embodiment 10A of FIGURES 2A–9, the slack adjuster 10A generally comprises a housing member 80 that is pivotally connected to the cylinder or live lever 20 by a suitable pin 82 which forms the pivotal connection 24. Housing member 80 receives a rod member 84 that has one end 85 thereof suitably threaded (see FIGURE 2B) for purposes of this invention, and the other end 87 (see FIGURE 4) suitably threaded for connection with extension rod 88 that makes up the remainder of the center rod structure 12 and is in turn pivotally connected in a conventional manner (not shown) to the dead lever 60 at pivotal connection 61.

As indicated in FIGURE 2A, the screw threaded end 85 of the rod member 84 is received within the housing member 80, and the housing member 80 generally comprises a spring chamber 90 in which is received about the rod member 84 a helical spring 92 that acts (between the housing 80 and a spring seat 94 fixed to the rod member 84) in a manner to draw the rod member 84 inside of the housing member 80.

The housing member 80 includes a friction stop clutch assembly generally indicated at 96 in FIGURES 2B, 6 and 7, which includes a pair of annular stop or seat members 98 and 99 that are fixed to the housing member 80 in spaced apart relation. Operating in the stop clutch space 97 between the seats 98 and 99 within the housing member 80 and on threaded end 85 of rod member 84 is a nut device 100 that in the form illustrated includes nut 101 provided with thrust bearing assemblies 102 and 104 on either side thereof.

The housing member 80 adjacent the stop clutch assembly 96 defines a transversely extending wall structure 106 provided with a central opening indicated at 107 from which extends a tubular extension 108 defining a bore 110 terminating in an abutment surface 112 in which the screw threaded end 85 of rod member 84 is received. Housing member 80 at the end of its extension 108 is provided with a more or less conventional clevis structure 114 adapted in a conventional manner for pivotal connection to the live lever 20 in the manner already indicated.

The tubular extension 108 of housing member 80 is made fast to the housing member 80 in any suitable manner, as by the screw threading 115 that is illustrated.

Cooperating with the nut device 100 on one side thereof is a slack pay out or let out spring 120 which is interposed between the thrust bearing assembly 104 and a spring seat 122 that is fixed with respect to the housing 80; on the other side of the nut 101 the thrust bearing assembly 102 is engaged by a plurality of thrust pin members 124 slidably mounted in the housing end wall structure 106 and engaged by a resiliently flexible thrust device 126 that forms a part of the slack take up control assembly 128 which is associated with the slack adjuster 10A for purposes of controlling the slack take up functions of the slack adjuster.

The slack take up control assembly 128 in addition to the thrust pins 124 and the resiliently flexible thrust assembly 126 includes a connecting rod 130 that is secured at one end 132 thereof to a disc member 134 slidably mounted on tubular extension 108, while the other end 136 of the rod 130 is suitably coupled to a movement control lever 140, as by employing angle arm 141 which is affixed to the end 136 of rod 130, with the control lever being fulcrumed at 143 (see FIGURE 1) to the car structure in a manner that is more specifically illustrated in FIGURES 3–5 where indicated at 144. Control lever 140 is pivotally connected to cylinder lever 20 as at 145.

The operating lever 140 by virtue of its pivotal connection with the car structure and its relation to the rest of the brake rigging introduces a differential motion into the operation of the slack take up control assembly 128 which controls the slack take up movements of the nut device 100 during the operation of the brake rigging.

The threading 146 of the threaded end 85 of rod member 84 should be such that when nut device 100 is free to rotate, and is biased by the slack take up control assembly 128 toward the left of FIGURE 2B (with respect to rod member 84), nut device 100 will move to the left of FIGURE 2B with respect to the rod member 84, which may be designated the nut slack take up rotational direction and is designated by the arrow 148 of FIGURE 2B (which is intended to designate clockwise rotational movement when viewed as shown in FIGURE 5).

Pay out spring 120 biases nut device 100 for rotation in the opposite direction, as designated by arrow 149 of FIGURE 2B, which may be designated the nut slack let out direction. And in accordance with this invention, the slack adjuster 10A is both extended and contracted by providing for rotation of the nut device 100 with respect to rod member 84 during the operation of the brake rigigng.

The slack adjuster 10A as supplied for application to a car ordinarily will be in its fully contracted position under the action of spring 92, which will dispose the terminal portion 160 of the rod member 84 against the abutment 112, and thus the rod member 84 will be withdrawn inside housing member 80 and its extension 108 to its fullest extent.

In this condition, the slack adjuster 10A is applied to the center rod structure 12 (since the embodiment 10A is adapted for center rod applications), and the slack adjuster control assembly 128 is appropriately associated with a control lever 140 in the manner already described or its equivalent. The positioning and orienting of the various parts of the slack take up control assembly 128 and lever 140 are arranged in accordance with the slack take up functions of device 10A that are about to be described. In this connection, the swinging movement of lever 140 with respect to the slack adjuster 10A should be such that the slack take up control assembly 128 applies a bias to nut device 100, through thrust pins 124, to the left of FIGURE 2B at approximately the same time during the power stroke of the brake cylinder that the brake shoes contact the wheels 57 (assuming that all brake shoes are new and in place).

After the slack adjuster 10A has been applied in its operating position in substantially the manner indicated, reaction of the high strength compression spring 92 tends to hold nut device 100 against seat member 98 of the stop clutch assembly 96, and thereby prevent any extension and contraction of the slack adjuster (see the dashed line showing of FIGURE 6).

When the brakes are initially set or applied by activating the brake cylinder 16 in the usual manner, the brake rigging center rod structure 12 goes under tension, and the rod member 84 and the housing member 80 tend to move with respect to each other in the directions of the arrows 162 of FIGURE 2A, thereby tending to compress spring 92. This action continues until the strength of the spring 92 is overcome to the extent that the nut device 100, which is carried by the rod member 84, becomes separated from its stop seat member 98 and starts to move in the direction of stop seat member 99 (with respect to the housing member 80).

Since it has been assumed that the slack adjuster 10A has been applied to a car brake rigging under operating conditions wherein all shoes are in place and are new, and since it has been assumed that the slack adjuster has been applied to the brake rigging 14 in its fully contracted relation, there will be insufficient slack in the rigging to permit the required seven inch brake cylinder stroke.

However, the pay out spring 120, once the power stroke has proceeded to the point where nut 101 is freed from seat 98, applies a bias to nut device 100 tending to turn the nut device 100 in its slack let out direction. And under these conditions, the differential motion that is applied to the slack take up control assembly 128 during the initial power stroke means that the thrust rod 130 will be short of its normal position with respect to the housing member 84, with the result that the nut device 100 will turn in its slack let out direction until the nut engages thrust pins 124 and through them presses assembly 126 against disc 134. When this point has been reached, the slack adjuster will be set to provide a brake cylinder stroke of 7 inches, and the rod member 84 will be extended its maximum amount from housing member 80.

The initial brake power stroke is completed by the nut device 100 being drawn against the clutch stop seat member 99 so that the full brake cylinder thrust forces are applied through the slack adjuster in the usual manner for center rod applications.

Thereafter, the normal operation of the slack adjuster will be as follows.

The usual operating position of the slack adjuster parts will be substantially as indicated in the dashed line position showing of FIGURE 6 wherein the nut device 100 is drawn against the stop seat member 98 by the action of compression spring 92.

When the brakes are applied, the rod member 84 and the housing member 80 move in the respective directions indicated by the arrows 162 to compress the spring 92 and move nut device 100 in the direction of stop seat member 99. In the meantime, the differential motion of the slack take up control assembly 128 that is provided by operating lever 140 moves thrust rod 130, disc 134, spring assembly 126, and thrust pins 124 to the left of FIGURE 2B with respect to the housing member 80, with the nut device 100 being free from seat member 98 about the time that the brake shoes engage wheels 57. Under the indicated conditions, and the proportioning of the parts and operating linkages contemplated by this invention, there ordinarily will be little or no rotation of nut device 100 as it moves between the seat members 98 and 99 during the power stroke, and after the nut device 100 engages the seat 99, the brake stroke continues to completion to apply the full thrust of the brake through the rigging to the brake shoes. In the meantime, movement of the control lever 140 continues, which effects further differential movement of the slack take up control assembly 126 with respect to housing member 80 and control rod 84, that in turn effects a resilient contraction of the spring assembly 126 due to the fact that the nut device 100 cannot move with respect to rod member 84 while it remains in contact with the stop seat member 99.

After the power stroke is completed, the air is released from the brake cylinder 16 and tension in the rigging disappears thereby permitting the brake beams 32 to swing away somewhat from the wheels 57. Simultaneously, the spring 92 operates to withdraw rod member 84 into housing member 80 to the extent that nut device 100 is separated from stop seat member 99, whereupon the bias that is applied to the nut device 100 by the compression of the spring assembly 126 turns the nut 101 (against the bias of pay out spring 120) in a slack take up direction that corresponds in amount to the brake shoe wear sensed by the operation of the control lever 140. The spring 92 continues to act to draw the nut device 100 against seat member 98 of stop clutch assembly 96, and when this has been effected, the slack adjuster apparatus is set in its operating position to handle the next brake stroke application.

During each brake stroke operation, the slack adjuster 10A functions to take up slack in substantially the same manner so long as no brake shoes are lost.

This continues until brake shoe wear has proceeded to the point where replacement of the brake shoes is required, and as a practical matter, the railroad car inspection by the employees known as "car knockers" determines from the appearance of brake shoes whether or not brake shoe replacement is necessary. Under ordinary circumstances, brake shoe replacement will be effected at about the time that the rod member 84 and the housing member 80 have the respective positions suggested by FIGURE 6.

In any event, it is common practice for the car knocker to replace shoes as part of his duties, and to do this, he customarily pries the brake beams away from, for instance, the car wheels 57, to provide enough working space to fit the shoes in place on the brake beams. The normal slack in the rigging plus the spacing of the seat members 98 and 99 of slack adjuster 10A accommodate the necessary brake beam movement to accommodate this replacement operation.

On first application of the brakes after replacement of the shoes, the operation of the slack adjuster 10A is the same as described in connection with initial application of the slack adjuster to the rigging, and this effects the extension of the slack adjuster that is necessary to insure the required 7 inch stroke of the brake cylinder.

In the event that a brake shoe, or perhaps two brake shoes become lost, during the next brake cylinder power stroke the operation of the parts is the same as described above in connection with normal operation except that the differential motion introduced to the slack take up conrol assembly 128 by operating lever 140 will move the thrust rod 130 to such a position that at the end of the power stroke the spring assembly 126 will be compressed subsantially to the extent shown in FIGURE 8. On release of the brakes, the resilient contraction of the spring assembly 126 introduces a substantial bias on nut 101 which insures its rapid rotation in the slack take up direction a sufficient amount to take up slack according to the amount required to compensate for the loss of the brake shoes.

However, where more than two brake shoes are lost, during the power stroke the spring assembly 126 goes solid under the differential movement imposed upon thrust rod 130 by operating lever 140 (see FIGURE 9), which condition under such circumstances will occur before nut 101 is separated from seat member 98. Further movement of the operating lever 140 will thereafter, during the power stroke, apply a direct thrust to the nut device 100, forcing its separation from seat member 98, and biasing it through thrust bearing assembly 102 to rotate rapidly in its slack take up direction as the nut moves with respect to the housing 80 toward seat member 99. After the brake power stroke is completed, any relative contraction remaining in the spring assembly 126 will again rotate nut 101 in its slack take up direction the amount required to insure that the brake cylinder 16 has the required 7 inch stroke on the next application of the brakes.

It will therefore be seen that I have provided a screw and nut type slack adjuster arrangement that is not only fully automatic in its operation in both slack take up and let out, but also the slack take up and let out action provided is accomplished in a single brake stroke except possibly under the most extreme conditions.

The slack adjuster 10B of FIGURE 10 operates in substantially the same manner, and is adapted to be incorporated in brake rigging 14 in place of slack adjuster 10A.

Slack adjuster 10B thus comprises a housing member 180 (that is equivalent to housing member 80), which is adapted to receive rod member 184 that may be considered to be the same as rod member 84.

Housing member 180 includes a wall structure 186, a tubular extension 188 (provided with a suitable clevis 190), and a stop clutch assembly 192 (including seat members 194 and 196, all equivalent to the corresponding parts described in connection with slack adjuster 10A). The rod member 184 has its screw threaded end 185 received within the housing 180, and the threading 198 is the same as that described in connection with slack adjuster 10A. The other end 200 of member 184 is formed for application to extension 88 of the center rod structure 12, as previously described.

The housing 180 defines a spring chamber 202 in which high strength compression spring 204 is mounted between the housing end wall 206 and spring plate 208 that is fixed with respect to rod member 184 in any suitable manner, all substantially the same as described in connection with the embodiment 10A.

Rod member 184 carries nut assembly or device 210 that operates in cooperation with the stop seat members 194 and 196 under the control of an actuating device 212 that is slidably mounted in the housing end wall structure 186, which is in turn operated by pay out or let out springs 214 and slack take up control assembly 216.

The actuator device 212 in the form illustrated comprises a ring member 218 fixed to the outwardly extending ends 220 of a plurality of thrust pins 222 that are slidably mounted in the wall structure 186 and are provided with angled end portions 224 which operably engage the nut device 210 between thrust bearings 226 and 228. Pay out springs 214 are interposed between the ring 218 and housing wall structure 186 about each thrust pin 222.

Slidably mounted on the housing extension 188 is a disc member 230 of slack take up control assembly 216 to which is secured a resiliently contractible control or thrust rod assembly 232 comprising a rod member 234 adjustably secured to disc 230 and telescopingly received in tubular member 236 in compressing relation with compression spring 238. Tubular member 236 is provided with a bracket 240 that engages operating lever 140 that is identical to lever 140 of FIGURE 1.

The device 10B is applied to brake rigging 14 in substantially the same manner as device 10A, with the end 200 of rod member 184 being secured to extension 88 of the center rod structure and the clevis 190 of the housing member 180 being secured to cylinder lever 20 by suitable pin 82. As already indicated, the slack take up control assembly 216 is operably connected to operating lever 140 in the manner suggested in FIGURE 10.

After device 10B has been applied to rigging similar to rigging 14 (and assuming new shoes have also been applied and no shoes are missing) when the brakes are initially set, the brake rigging center rod structure of which the slack adjuster 10B forms a part goes under tension, and the housing member 180 and rod member 184 tend to move in the relative direction indicated by the arrows 252. While spring 204 in tending to move rod 184 within housing 180 biases nut device 210 against its seat member 194 to prevent rotation thereof with respect to rod member 184, this biasing action is overcome as the brake stroke continues and the tension forces involved tend to pull rod member 184 to the left of FIGURE 10 with respect to housing member 180. This action ultimately disposes the enlarged or head end 255 of the nut assembly 210 in an intermediate position with respect to seat member 194 and 196, freeing same to rotate if an appropriate biasing action is being applied to the nut device. For this purpose, the pay out springs 214 are compressed to the extent necessary to apply sufficient bias to the nut device 210 to rotate same in its pay out direction as required to disposed rod member 184 with respect to housing member 180 as required to give the brake cylinder the standard 7 inch stroke. As the power stroke continues, the nut device 210 is brought into engagement with seat member 196 for transmission through the housing and rod members of the tension forces normally associated with brake rigging.

On release, the spring 204 tends to redraw the rod member 184 back into the housing member 180 until the head end 255 of nut device 210 is brought against the seat member 194.

During operation of the device 10B, the rigging slack occasioned by brake shoe wear is taken up by reason of the operation of the slack take up control assembly 216 under the control of operating lever 140.

Thus, during the brake power stroke, tension forces are applied through the housing and rod members 180 and 184 in the manner indicated immediately above to bring the nut device 210 into engagement with seat member 196. In the meantime, the differential motion that is introduced or imposed upon the assembly 216 by operating lever 140 moves thrust rod assembly 232 to the left of FIGURE 10 (with respect to housing member 180) to bring disc 230 into engagement with ring 218 of thrust pin assembly 212. The amount of brake shoe wear imposed on the brake system will be reflected by corresponding compression of the thrust rod assembly 232 by virtue of its resiliently flexible nature, and this, of course, moves thrust pins 222 against thrust bearing assembly 228.

On release of the slack adjuster, the operation of spring 204 tends to separate the nut device 210 from seat member 196, whereupon the biasing action imposed on nut device 210 by spring 238 of the thrust rod assembly 232 rotates the nut device 210 in its slack take up direction an amount corresponding to the brake shoe wear.

The biasing action of main spring 204 draws nut device against its seat member 194 to stop its rotation and await the next brake cylinder operation.

When brake shoe wear has proceeded to the point where new shoes are to be applied, the car knocker proceeds to do this job by prying the brake beams involved away from the truck wheels, and then applying the shoes in the usual manner.

When all of the brake shoes are in place, and the brake apparatus is first actuated, the tension forces acting through the center rod structure move the rod member 184 and the housing member 180 in the relative directions indicated by arrows 252, which frees the nut device 210 from engagement with seat member 194, after which the biasing action of the springs 214 on thrust pins 222, acting on nut device 210 through thrust bearing assembly 226, biases the nut device 210 to rotate in its slack let out direction until the disc 218 engages the disc 230, whereupon the nut device 210 will be moved into engagement with the stop seat member 196 unless this has already been accomplished by the aforeindicated relative movement between the rod member 184 and the housing member 180.

The slack adjuster 10B will then be set to provide the desired brake cylinder stroke of 7 inches.

Specific description

The brake rigging 14 in practice may be of any suitable type, although the slack adjusters 10A and 10B are best adapted for center rod brake rigging applications. However, it will be obvious to those skilled in the art that the slack adjusters illustrated may be readily adapted for application to other brake rigging arrangements, and by making appropriate adjustments in the mounting and proportioning of the operating lever 140 or its equivalents, the slack adjusters of this invention may be applied in any slack controlling point in such rigging.

In the showing of FIGURES 3–5, the slack adjuster 10A and the brake cylinders 16 have been shown as applied to a car structure that includes a fixed center sill 270 of the conventional Z–26 type, of which are shown its depending side walls 272 and its laterally extending bottom flanges 274. The cylinder lever 20 is shown in its customary sliding support arrangement with an appropriate bracket 276 carried by the center sill 270, while the operating lever 140 is shown pivoted to the cylinder lever 20 by appropriate bolt and nut arrangement 278 forming pivotal connection 245, in the manner suggested in my copending application Serial No. 144,144, filed October 10, 1961, now Patent No. 3,119,470, granted January 28, 1964 (the disclosure of which is hereby incorporated in its entirety by this reference), with the pivotal connection 143 of the operating lever 140 being in the form of a bracket structure 280 comprising an angle member 282 fixed to the center sill 270 as by appropriate rivets 284 and adjustably carrying a plate 286 that is provided with an elongated slot 288 through which the end 290 of operating lever 140 extends. The plate 286 should be positioned with respect to the brake cylinder 16 so that the slot 288 is in vertical alignment with the center line of the brake cylinder 16, and the rounded end 292 of slot 288 (see FIGURE 3) forms the fulcrum for a lever 140.

For adjustment purposes, the plate 282 is provided with elongate slots 294 through which appropriate bolts 296 extend for connection with the vertical flange 298 of the angle member 282.

The housing member 80 of slack adjuster 10A may take the form of a tubular member 300 which is preferably, but not necessarily, rounded in configuration. Tubular member 300 at its end 302 is closed by a suitable end plate structure 304, welded in place as at 306 (or otherwise made fast to the tubular member 300), which end plate structure defines a spring seat 308 for one end 310 of spring 92. End plate structure 304 may be provided with an appropriate seal device 312 and an annular spring seating collar portion 314, which is preferably counterbored as at 316 to receive a sleeve member 318 that has its bore 320 proportioned to substantially complement the exterior surface 322 of rod member 84. Sleeve member 318 is fixed to the end plate structure 304 in any suitable manner, as by welding at 324, and serves the purpose together with the seal 312, of precluding the entrance of foreign materials into the spring chamber 90 that is defined by the housing 80.

The tubular member 300 at its other end 326 has affixed thereto, as by welding at 327, an extension sleeve 328 that screw threadedly receives shell member 329, which in turn screw threadedly receives an apertured disc 330 that comprises wall structure 106 of tubular member 80. The disc 330 is formed with a central internally threaded opening 332 in which is mounted the tubular extension 108, and the thrust pins 124 are applied in spaced apertures 334 of the disc 30 that are positioned between opening 332 and its threaded rim 335.

In the illustrated specific construction of FIGURES 2A–9, the extension sleeve 328 defines an abutment surface 336 against which is seated the annular ring 338 that defines the stop seat member 99 of stop clutch 96, which seat is formed with tapered friction seat or surface 340 that is to be engaged by the nut device 100.

The seat member 99 is separated from seat 98 by spacer sleeve 342, and the seat member 98 is defined by annular ring 344 that is formed with inclined friction seat or surface 346 that is to be engaged by the nut device 100. Separating the seat member 98 from disc 330 in the illustrated construction is another separator sleeve 348, and the disc 330 is turned up against the seat members 98, 99 and the respective separator sleeves to seat them firmly against each other and against the annular edge surface 336 of extension sleeve 328.

The rod member 84 comprises an elongated bar 350 which preferably is round in cross-sectional configuration in its unthreaded portion, although obviously it may have other cross-sectional configurations that are consistent with the purposes of this invention. The threading 146 may be of any suitable type that will provide the slack take up and let out functions indicated, though the threading should be such that the threading and nut are not self locking so that the nut will readily rotate with respect to the screw when appropriate thrusts are applied to either of the thrust bearing assemblies 102 and 104.

The end 169 of the threaded portion 85 of rod member 84 in the illustrated embodiment comprises a bronze bearing sleeve 354 (see FIGURE 2B) applied over a reduced terminal portion 358 and secured in place by an appropriate shear pin 360. The sleeve 354 should be proportioned to substantially complement the bore 110 of the tubular extension 108 for appropriate guiding purposes.

The nut device 100 comprises a nut 101 in the form of a body 360 formed with an annular flange or rim portion 362 shaped to define angled friction surfaces 364 and 366 that are to engage, respectively, with the friction surfaces 346 and 340. The body 360 defines on each side thereof collar portions 370 and 372 on which the thrust bearing assemblies 102 and 104 are respectively mounted. The thrust bearing assemblies may be of any conventional type that includes a series of rolling members 374 applied between a pair of race members 376 and 376A, and the bearing structures shown in connection with thrust bearing assemblies 102 and 104 are diagrammatically illustrated only, except that it should be understood that in each thrust bearing assembly, the races 376A must be rotatably mounted with respect to the races 376, and the nut 362 must be rotatably mounted with respect to the races 376.

In the illustrated arrangement, the thrust bearing assembly 102 is secured in place by a suitable lock ring device 380, while in the case of thrust bearing assemblies 104, the pay out spring 120 holds it in place.

Nut 101 is bored and internally threaded as at 381 for screw threading engagement with threading 146 of rod member 84.

The spring seat 122 of the pay out spring 120 is shown in the form of a disc member 382 that is shaped to define a laterally extending annular sleeve portion 384 for the purposes of properly locating the pay out spring 120. Spring 120 may be any suitable form of compression spring applied between disc member 382 and thrust bearing assembly 104.

The slack take up control assembly 128 includes a collar member 390 (see FIGURE 2B) that is fixed with respect to the end of tubular extension 108, as by employing set screw 392, and is provided with an extension 394 that is bored as at 396 to receive and guide the thrust rod 130.

Thrust rod 130 has fixed to its end 136 the angled shaped bracket 141, as by welding at 398, while at its other end 132, the thrust rod 130 is fixed to boss 400 that is in turn fixed with respect to sliding disc 134, the latter being formed with an appropriate central opening 402 that substantially complements the exterior surface 404 of the tubular extension 108. Affixed to the rim 306 of the disc 134 is a cylindrical housing sleeve 408 that is proportioned to slidably engage over the exterior surface 410 of sleeve 329 and remain in contact with such surface 410 during all possible operating positions of the slack adjuster 10A.

This completely protects the resiliently flexible spring assembly 126.

Thrust rod 130 at its end 136 is formed with a spherically contoured terminal portion 412 for wear free engagement with the edge 414 of operating lever 140.

The spring assembly 126 comprises an inner cylinder member 420 telescopingly received within an outer cylinder member 422, with the external diameter of the cylinder member 420 being proportioned to substantially complement the internal diameter of the cylinder member 422. The cylinder member 420 has fixed thereto in any suitable manner at one end thereof an end plate 424 while the cylinder member 422 has fixed thereto at its corresponding opposite end an end plate 426, with the end plates 424 and 426 being formed with central openings 428 and 430, repsectively, that substantially complement the exterior surface 404 of the tubular extension 108.

The spring device 126 further comprises a high strength compression spring 432 that seats against the respective end plates 424 and 426 for the purpose of biasing the cylinder members 420 and 422 to their extended relation that is shown in FIGURE 2B. The cylinder member 420 carries a screw member 434 that operates in slot 436 formed in the cylinder member 422 for purposes of limiting the outward telescoping movement of the cylinders 420 and 422. Slot 426 is formed with a stop surface 438 which is engaged by screw 434 in the extended position of the device 126.

The thrust pins 124 comprise suitable pin members 440 mounted for free shifting movement in the openings 334 of disc member 330, and the pin members 440 may be provided with suitable head portions 442.

The heads 442 of thrust pins 440 are for the purpose of providing appropriate contact with the thrust bearing assembly 102.

As previously indicated, it is the relative movement between the cylinder members 420 and 422, under the guiding action of the control linkage that includes operating lever 140, during the power stroke of the brake rigging, that prepositions the unit 126 for purposes of applying the bias to the nut device 100 for turning it in its slack take up direction as required to compensate for the wear on the brake shoes by any particular braking operation. The corresponding compression of the spring 432 is what actually produces the biasing action, the amount of which may be measured by the spacing of the screw 434 from the stop surface 438 of slot 436.

In the unlikely event that more than two shoes are lost by the car, as previously described, the spring device 126 goes solid, as indicated in FIGURE 9, in that the end 450 of the cylinder 420 comes into engagement with the end plate 426 of the cylinder 422, all under the guiding action of the control linkage of which the operating lever 140 forms a part. When this happens, a solid and unyielding thrust linkage is established between the operating lever 140 and the nut device 100 for purposes of insuring that the slack take up action that is required under such circumstances is immediately provided.

Referring now to the embodiment 10B of FIGURE 10, this slack adjuster may be applied to the rigging 14 in substantially the manner described above. Housing member 180 comprises a tubular member 460 provided with an end plate 462 forming end wall 206 at its end 464 for purposes of closing the housing member 180 at this end and providing a spring seat for the spring 204. The end plate 462 is formed with an annular locating flange 464 and is provided with an appropriate seal device 466 and extension sleeve 468 that serves the same general purpose as described in connection with the seal 312 and the sleeve 318 of the embodiment of FIGURES 2A–9, with sleeve 468 being welded to end plate 462 as at 469.

The tubular member 460 at its other end 470 screw threadedly receives sleeve member 472 which threadedly mounts disc member 474 that defines the end wall structure 186.

The sleeve 472 is formed with an annular shoulder 478 for the purposes of firmly seating clutch seat member 480 and 482 that form a part of clutch stop device 192, as by gripping them between the abutment 478 and the end 484 of tubular member 460.

The plates 194 and 196 are formed with the respective angled friction surfaces or seats 486 and 488 for purposes of engaging with the nut device 210.

The tubular extension 188 of slack adjuster 10B is applied to the threaded central opening 490 of disc member 474, and is essentially the same as that described in connection with the embodiment 10A.

The rod member 184 is essentially the same as rod member 84 except that the bearing sleeve 354 and the corresponding portion provided by extension 358 have been eliminated, with the end surface 250 of plate 482 serving as the stop for rod member 184 in this embodiment of the invention (which surface 250 is thus engaged by spring plate 208).

The nut device 210 comprises a nut 499 including head portion 500 that is provided with angled friction surfaces 502 and 504 for engaging the respective friction surfaces 486 and 488. The nut device 210 also includes a longitudinally extending flange portion 506 on which are mounted in spaced relation the respective thrust bearing assemblies 226 and 228, which are essentially the same as thrust bearing assemblies 102 and 104 (as indicated by corresponding reference numerals). The flange portion 506 of nut device 210 has fixed to its end 508 a stop ring member 510 that serves as a seat for the thrust bearing assembly 226, while the thrust bearing assembly 228 is applied against an annular shoulder 512 of the nut.

As indicated, the angled ends 224 of thrust pin members 222 are applied between the thrust bearing assemblies 226 and 228, and they should have their inner surfaces 514 proportioned to substantially complement the exterior surface 516 of the nut extension flange 506 to prevent them from shifting out of operating position.

The thrust pins 222 are affixed to disc 218 in any suitable manner.

The rod assembly 232 of the slack take up control assembly 216 includes the tubular member 236 which is fixed to appropriate channel shaped bracket 240 in any suitable manner that in turn engages over operating lever 140 in the same manner as in the embodiment 10A. Bracket 240 may be convexly rounded as at 517 for good bearing engagement with lever 140.

The rod member 234 has its end portion 520 received within the tubular member 236 and carries a screw member 522 operating in slot 524 formed in the member 236 for the purpose of limiting the telescoping movement of the two members 236 and 234. The rod assembly 232 has its maximum length when the screw 522 seats against end surface 526 of slot 524, and has its minimum length when the screw 522 seats against end surface 528 of slot 524. In the latter position, the rod assembly 232 provides the substantially rigid thrust assembly that is described in connection with the spring device 126 as illustrated in the showing of FIGURE 9.

The rod member 234 has its end 530 appropriately threaded for engagement in threaded bore 532 of disc 230, with the nut 534 being appropriately positioned to serve as a stop and locking device.

With regard to the slack pay or let out springs of both illustrated embodiments of the invention, the relative strength of the springs 120 and 214 and the positioning and adjustment of the slack adjuster slack take up control assemblies should be proportioned and arranged to effect sufficient slack let out in rotation of the illustrated nut devices, under the indicated slack let out effecting conditions, to provide the brake cylinder with the desired 7 inch stroke when such rotation has been completed. Also, the relative strengths of the pay out springs and the springs making up the resiliently contractible devices 126 and 232, as well as the strength of main springs 92 and 204, must be proportioned to effect the slack take up and let out actions described above. Obviously, however, these are design problems which can readily be solved by those skilled in the art.

*Distinguishing characteristics of the invention*

It will therefore be seen that I have provided a fully automatic slack adjuster arrangement of improved simplicity and reliability.

It will be noted, for instance, that the two embodiments illustrated involve a minimum of moving parts, and only a single nut structure is required which is well housed against the elements. Furthermore, this device when appropriately mounted in position in a conventional brake rigging will make available the slack adjusting action that is desired to very close tolerances, and this is done in a single brake cylinder stroke under ordinary circumstances.

The few and simple parts required by my invention involve much less machining than comparable prior art devices, and only about half as many separate parts. Moreover, the weight of applicant's device is materially reduced over that of comparable prior art devices.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. An automatic two way slack adjuster adapted to form a part of railroad car brake rigging as a force transmitting device, said adjuster comprising:

a pair of elongate members disposed in juxtaposed parallel relation, one of said members comprising a screw member, a nut screw threadedly carried by said screw member and mounted for movement longitudinally of the other of said members on relative movement between said members longitudinally thereof, the other of said members carrying a stop clutch assembly including seats positioned on either side of said nut, resilient means for biasing said members to move in a slack take up direction with respect to each other, which motion biases said nut against one of said seats, let out resilient means acting between said other member and said nut for biasing said nut to rotate in a slack let out direction, and take up control means for biasing said nut to rotate in a slack take up direction against the biasing action of said let out resilient means in a predetermined position of said control means with respect to said members, said take up control means including actuator means movable with respect to said members and including means for operatively engaging said nut, and means for actuating said actuator means to bias said nut for said rotation in said take up direction in said predetermined positions of said control means, said take up control means having a second predetermined position wherein said let out resilient means bias is effective to rotate said nut in said slack let out direction, said nut being biased against said one seat in the release position of said adjuster by the first mentioned resilient means, and on application of forces to said adjuster tending to move said members in opposition to said first mentioned resilient means, said nut being drawn against the other of said seats to transmit thrust forces through the adjuster.

2. An automatic two way slack adjuster adapted to form a part of railroad car brake rigging as a force transmitting device, said adjuster comprising:

a rod member having a screw threaded portion and a nut screw threadedly mounted on said screw threaded portion, a housing member received over said screw threaded portion of said rod member, said housing and rod members being movable relative to each other longitudinally of said rod member in slack take up and let out directions and said nut moving with said rod member on said relative movement between said members, said housing member carrying a stop clutch assembly including opposed friction stop seats positioned on either side of said nut and spaced to be alternatively engaged by said nut when said rod member is moved in either direction longitudinally thereof relative to said housing member, resilient means for biasing said members to move in a slack take up direction with respect to each other, which motion draws said nut against one of said
   seats whereupon said motion is stopped and rotation
   of said nut with respect to said rod member is
   precluded,
said nut being drawn against the other of said seats to
   transmit thrust forces through said adjuster on
   application of forces to said adjuster in opposition to
   said resilient means,
slack take up control means for biasing said nut to
   rotate in a slack take up direction with respect to
   said rod member in a predetermined position of said
   control means with respect to said members when
   said nut is in a position intermediate said seats,
said take up control means including resiliently flexible
   actuator means movable with respect to said members and including means for operatively engaging
   said nut for biasing same to rotate in said slack take
   up direction,
said actuator means including means for flexing same
   in proportion to the slack to be taken up in the
   rigging and means for applying to said nut the resilient restorative forces of said actuator means that
   oppose said flexing means to bias said nut to rotate
   same in said take up direction the amount required
   to take up the slack in the rigging,
and means for biasing said nut to rotate in a slack
   let out direction in a second predetermined position
   of said control means with respect to said members
   when said nut is in a position intermediate said seats.

3. An automatic two way slack adjuster adapted to form a part of railroad car brake rigging as a force transmitting device, said adjuster comprising:
   a pair of elongate members disposed in juxtaposed parallel relation,
   one of said members comprising a screw member,
   a nut screw threadedly carried by said screw member,
   the other of said members carrying a stop clutch assembly including seats positioned on either side of said nut,
   resilient means for biasing said members to move in a slack take up direction with respect to each other, which motion biases said nut against one of said seats,
   let out resilient means acting between said other member and said nut for biasing said nut to rotate said nut to a predetermined position with respect to said one member in a slack let out direction when said nut is in a position intermediate said seats,
   and take up control means for biasing said nut to rotate in a slack take up direction,
   said take up control means comprising resiliently flexible actuator means operatively engageable with said nut for biasing same to rotate in said take up direction when said nut is in a position intermediate said seats,
   said actuator means including means for flexing same in proportion to the slack to be taken up in the rigging and means for applying the resilient restorative forces of said actuator means that oppose said flexing means to apply said bias to said nut to rotate same in said take up direction the amount required to take up the slack in the rigging.

4. An automatic two way slack adjuster adapted to form a part of railroad car brake rigging as a force transmitting device, said adjuster comprising:
   a housing member,
   a rod member mounted in said housing member for movement with respect thereto in slack take up and let out directions,
   said rod member having a threaded portion,
   a nut screw threadedly carried by said rod member on its said threaded portion and mounted for movement longitudinally of said housing member on relative movement between said member longitudinally thereof,
   said housing member carrying a stop clutch assembly including stop seats positioned on either side of said nut and positioned to be engaged by said nut on movement of said nut longitudinally of said housing,
   resilient means for biasing said members to move in a slack take up direction with respect to each other, which motion biases said nut against one of said seats,
   slack let out resilient means acting between said housing member and said nut for rotating said nut in a slack let out direction to move same a predetermined amount with respect to said housing member when said nut is in a position intermediate said seats,
   and slack take up control means carried by said housing for biasing said nut to rotate in a slack take up direction,
   said take up control means comprising:
   an actuator mounted for shifting movement with respect to said members,
   and means for actuating said actuator to rotate said nut in said take up direction the amount required to take up the slack in the rigging,
   said actuating means comprising:
   a resiliently flexible component,
   means for flexing said component in proportion to the slack in the rigging,
   and means for applying the resulting bias to said nut through said actuator whereby said nut is rotated in said take up direction the amount required to take up the slack in the rigging.

5. The slack adjuster set forth in claim 4 wherein said actuator comprises:
   a member mounted on said housing for shifting movement longitudinally thereof and operably connected between said nut and said flexible component,
   and wherein said flexing and applying means comprises:
   means for controlling the movement of said flexible component during the power and release strokes of said slack adjuster to cause said bias generated by said flexing of said flexible component to operate against said nut to rotate same in said take up direction.

6. An automatic two way slack adjuster adapted to form a part of railroad car brake rigging as a force transmitting device, said adjuster comprising:
   a housing member,
   a rod member mounted in said housing member for movement with respect thereto in slack take up and let out directions,
   said rod member having a threaded portion,
   a nut screw threadedly carried by said rod member on its said threaded portion,
   said housing member carrying a stop clutch assembly including stop seats positioned on either side of said nut and positioned to be engaged by said nut on movement of said nut longitudinally of said housing,
   resilient means for biasing said members to move in a slack take up direction with respect to each other, which motion biases said nut against one of said seats,
   slack let out resilient means acting between said housing member and said nut for rotating said nut in a slack let out direction to move same a predetermined amount with respect to said housing member when said nut is in a position intermediate said seats,
   and slack take up control means carried by said housing for biasing said nut to rotate in a slack take up direction,
   said take up control means comprising:
   an actuator component carried by said housing and mounted for shifting movement with respect thereto,
   means for operably connecting said actuator component to said nut to bias same to rotate in said take up direction when said nut is in a position intermediate said seats, means for actuating said actuator component to rotate said nut in said take up direction, said actuating means including a linkage component operably engageable with said actuator component, one of said components being resiliently flexible.

7. The slack adjuster set forth in claim 6 wherein:
said actuator component comprises pin means slidably mounted in said housing for engaging said nut to rotate same in said take up direction, and wherein said linkage component comprises a telescoping cylinder assembly comprising telescopingly related housing members and compression spring means interposed between said housing member for biasing them away from each other.

8. The slack adjuster set forth in claim 6 wherein:
said actuator component comprises pin means slidably mounted in said housing for engaging said nut to rotate same in said take up direction, and wherein said linkage component comprises a telescoping rod assembly including a tubular member, a rod element slidably mounted in said tubular member, and compression spring means interposed between said tubular member and said rod element for biasing said rod element outward of said tubular member.

9. An automatic two way slack adjuster adapted to form a part of railroad car brake rigging as a force transmitting device, said adjusted comprising:

a housing member, a rod member mounted in said housing member for movement with respect thereto in slack take up and let out directions, said rod member having a threaded portion, a nut screw threadedly carried by said rod member on its said threaded portion, said housing member carrying a stop clutch assembly including stop seats positioned on either side of said nut and positioned to be engaged by said nut on movement of said nut longitudinally of said housing, resilient means for biasing said members to move in a slack take up direction with respect to each other, which motion biases said nut against one of said seats, slack let out resilient means acting between said housing member and said nut for rotating said nut in a slack let out direction to move same a predetermined amount with respect to said housing member when said nut is in a position intermediate said seats, and slack take up control means carried by said housing for biasing said nut to rotate in a slack take up direction, said housing member comprising a tubular component receiving said threaded portion of said end member, said threaded portion of said rod member being at one end thereof, with the other end of said member projecting outwardly of one end portion of said housing member, with the other end portion of said housing member defining an end wall and a tubular extension projecting outwardly of said housing member and proportioned to receive said rod member threaded portion, said stop clutch assembly seats being disposed adjacent said end wall, said slack take up control means comprising:

pin means mounted in said end wall for movement longitudinally of said housing and positioned to engage said nut, resiliently flexible linkage means operably secured to said housing for engaging said pin means for biasing same against said nut to move same in said take up direction, and means for controlling the movement of said flexible linkage means during the power and release strokes of said slack adjuster to cause the bias generated by the flexing of said flexible linkage to operate against said nut to rotate same in said take up direction.

10. The slack adjuster set forth in claim 9 wherein:
said rod member adjacent its said threaded portion fixedly carries abutment means, and including compression spring means interposed between said abutment means and said one end portion of said housing member, said compression spring means comprising the first mentioned resilient means, said one end portion of said housing member including an inwardly directed tubular segment through which said rod member extends, and which is proportioned to substantially complement the exterior configuration of said rod member.

11. The slack adjuster set forth in claim 9 wherein:
said resiliently flexible linkage comprises a pair of housing members mounted on said housing member extension for movement longitudinally thereof, compression spring means interposed between said linkage housing members for resiliently resisting movement of said linkage housing members toward each other, one of said linkage housing members being positioned to engage said pin means, said flexible linkage housing members being proporportioned to fully telescope when a predetermined amount of slack occurs in the rigging to thereupon become an inflexible thrust component acting to force said nut away from said one seat and rotate same in said slack take up direction.

12. The slack adjuster set forth in claim 9 wherein:
the outwardly projecting portion of said extension forms a stop seat engageable by said one end of said rod member.

13. The slack adjuster set forth in claim 11 including:
a protective sleeve overlying said flexible linkage housing members and the adjacent portion of said housing member.

14. In a railroad car brake system arrangement including a brake cylinder and piston device operatively connected to one end of a cylinder lever which is in turn connected by a center rod structure to a dead lever swingably anchored at one end thereof to the car, with the other ends of the cylinder and dead levers being adapted to be operatively connected to railroad car truck brake apparatus, said brake device being oriented with respect to the car to apply tension forces to said center rod structure during its brake actuating power stroke, and a brake rigging slack adjusted for maintaining substantially uniform the power stroke length of said brake device, said adjuster comprising:

a housing member, a rod member mounted in said housing member for movement with respect thereto in slack take up and let out directions, said rod member having a threaded portion, a nut screw threadedly carried by said rod member on its said threaded portion, said housing member carrying a stop clutch assembly including stop seats positioned on either side of said nut and positioned to be engaged by said nut on movement of said nut longitudinally of said housing, resilient means for biasing said members to move in a slack take up direction with respect to each other, which motion biases said nut against one of said seats, slack let out resilient means acting between said housing member and said nut for rotating said nut in a slack let out direction to move same a predetermined amount with respect to said housing member when said nut is in a position intermediate said seats, and slack take up control means carried by said housing for biasing said nut to rotate in a slack take up direction,
said housing member comprising a tubular component receiving said threaded portion of said end member,
said threaded portion of said rod member being at one end thereof,
with the other end of said rod member projecting outwardly of one end portion of said housing member,
with the other end portion of said housing member defining an end wall and a tubular extension projecting outwardly of said housing member and proportioned to receive said rod member threaded portion,
said stop clutch assembly seats being disposed adjacent said end wall,
said slack take up control means comprising:
pin means mounted in said end wall for movement longitudinally of said housing and positioned to engage said nut,
resiliently flexible linkage means operably secured to said housing for engaging said pin means for biasing same against said nut to move same in said take up direction,
and means for controlling the movement of said flexible linkage means during the power and release strokes of said slack adjusted to cause the bias generated by the flexing of said flexible linkage to operate against said nut to rotate same in said take up direction,
with the other end position of said housing member being pivotally secured to said cylinder lever intermediate the ends of said cylinder lever,
and with the other end of said rod member being pivotally secured to said dead lever intermediate the ends thereof,
said movement controlling means comprising:
an operating arm swingably connected to the car to swing about a fulcrum that is vertically aligned with the longitudinal axis of said brake device,
said operating arm being secured to said cylinder lever at a point spaced from said other ends thereof.

15. In a railroad car brake system arrangement including a brake cylinder and piston device operatively connected to one end of a cylinder lever which is in turn connected by a center rod structure to a dead lever swingably anchored at one end thereof to the car, with the other ends of the cylinder and dead levers being adapted to be operatively connected to railroad car truck brake apparatus, said brake device being oriented with respect to the car to apply tension forces to said center rod structure during its brake actuating power stroke, and a brake rigging slack adjuster for maintaining substantially uniform the power stroke length of said brake device, said adjuster comprising:
first and second telescoping members operatively connected to said cylinder and live levers respectively intermediate the ends thereof,
adjusting means for causing said telescoping members to move relative to each other in a slack take up direction,
actuator means for controlling the operation of said adjusting means,
and control means for controlling the actuation of said actuator means,
said control means comprising:
an operating arm swingably connected to the car adjacent one end thereof to swing about a fulcrum that is vertically aligned with the longitudinal axis of said brake device on one side of said slack adjuster,
said operating arm on said other side of said slack adjuster being secured adjacent its other end to said cylinder lever at a point spaced from said other end of said cylinder lever.

References Cited by the Examiner
UNITED STATES PATENTS
3,096,859    7/63    Showers et al. _____ 188—196

ARTHUR L. LA POINT, *Primary Examiner.*
DUANE A. REGER, *Examiner.*

UNITED STATES PATENT OFFICE
CERTIFICATE OF CORRECTION

Patent No. 3,177,985                      April 13, 1965

Gerard Rauglas

It is hereby certified that error appears in the above numbered patent requiring correction and that the said Letters Patent should read as corrected below.

Column 19, line 42, for "ends" read -- end --.

Signed and sealed this 14th day of September 1965.

(SEAL)
Attest:

ERNEST W. SWIDER
Attesting Officer

EDWARD J. BRENNER
Commissioner of Patents